(12) United States Patent
Behr et al.

(10) Patent No.: US 8,884,521 B2
(45) Date of Patent: Nov. 11, 2014

(54) MOTOR VEHICLE HEADLIGHT ELEMENT (75) Inventors: Gerhard Behr, Altheim/Alb (DE); Alois Biebl, Train-St. Johann (DE); Moritz Engl, Regensburg (DE); Heinz Haas, Regensburg (DE); Stefan Hackenbuchner, Munich (DE); Peter Helbig, Sontheim an der Brenz (DE); Günther Hirschmann, Munich (DE); Markus Hofmann, Bad Abbach (DE); Rainer Huber, Pentling (DE); Joachim Reill, Zeitlarn (DE); Thomas Reiners, Bachhagel (DE); Ralf Vollmer, Heidenheim (DE)

(73) Assignee: Osram AG, Munich (DE)

( * ) Notice: Subject to any disclaimer, the term of this patent is extended or adjusted under 35 U.S.C. 154(b) by 0 days.

(21) Appl. No.: 13/417,516

(22) Filed: Mar. 12, 2012

(65) Prior Publication Data

US 2012/0169232 A1  Jul. 5, 2012

Related U.S. Application Data (63) Continuation of application No. 11/721,870, filed as application No. PCT/DE2005/002154 on Nov. 30, 2005, now Pat. No. 8,159,144.

(30) Foreign Application Priority Data

Dec. 17, 2004  (DE) .................. 10 2004 060 890

(51) Int. Cl.
*B60Q 1/02* (2006.01)

(52) U.S. Cl.
USPC ............ 315/82; 315/77; 315/185 S; 315/291; 315/158

(58) Field of Classification Search
USPC .......... 315/247, 209 R, 224, 291, 307, 185 S, 315/49–55
See application file for complete search history.

(56) References Cited

U.S. PATENT DOCUMENTS

| | | | |
|---|---|---|---|
| 5,783,909 | A | 7/1998 | Hochstein |
| 6,066,861 | A | 5/2000 | Höhn et al. |
| 6,304,464 | B1 | 10/2001 | Jacobs et al. |
| 6,304,828 | B1 | 10/2001 | Swanick et al. |

(Continued)

FOREIGN PATENT DOCUMENTS

| | | |
|---|---|---|
| DE | 19805771 | 8/1999 |
| DE | 19950135 | 4/2001 |

(Continued)

OTHER PUBLICATIONS

Schnitzer, I. et al., "30% External Quantum Efficiency from Surface Textured, Thin-film Light-emitting Diodes", *Appl. Phys. Lett.*, vol. 63, No. 16, pp. 2174-2176, 1993.

(Continued)

*Primary Examiner* — Tuyet Thi Vo
(74) *Attorney, Agent, or Firm* — Fish & Richardson P.C.

(57) ABSTRACT

A motor vehicle headlight element is specified which has at least one light-emitting diode and at least one control apparatus. The control apparatus is suitable for processing a signal which is dependent on a measurement variable and for applying a current, corresponding to the signal, to the light-emitting diode. The control apparatus and the light-emitting diode are arranged on a common mount.

18 Claims, 4 Drawing Sheets

(56) References Cited

U.S. PATENT DOCUMENTS

| | | | |
|---|---|---|---|
| 6,371,636 B1 | 4/2002 | Wesson | |
| 6,441,558 B1 * | 8/2002 | Muthu et al. | 315/149 |
| 6,498,440 B2 * | 12/2002 | Stam et al. | 315/291 |
| 6,515,434 B1 | 2/2003 | Biebl | |
| 6,995,355 B2 | 2/2006 | Rains, Jr. et al. | |
| 7,145,125 B2 * | 12/2006 | May et al. | 250/228 |
| 7,321,109 B2 * | 1/2008 | Shur et al. | 250/205 |
| 7,334,917 B2 | 2/2008 | Laski | |
| 7,521,872 B2 * | 4/2009 | Bruning | 315/158 |
| 7,906,917 B2 * | 3/2011 | Tripathi et al. | 315/291 |
| 2002/0041498 A1 | 4/2002 | Furst et al. | |
| 2002/0191416 A1 | 12/2002 | Wesson | |
| 2003/0020415 A1 | 1/2003 | Bruning | |
| 2003/0063477 A1 | 4/2003 | Stepanenko et al. | |
| 2004/0164685 A1 | 8/2004 | Dygert | |
| 2004/0178737 A1 | 9/2004 | Takeda et al. | |
| 2004/0233678 A1 | 11/2004 | Ishida et al. | |
| 2008/0129220 A1 | 6/2008 | Shteynberg et al. | |
| 2008/0296589 A1 * | 12/2008 | Speier et al. | 257/82 |
| 2011/0180687 A1 * | 7/2011 | Rains et al. | 250/205 |

FOREIGN PATENT DOCUMENTS

| | | | |
|---|---|---|---|
| DE | 102004008896 | 9/2004 | |
| DE | 103 13 246 | 10/2004 | B60Q 1/100 |
| EP | 1298007 | 4/2003 | |
| EP | 1388461 | 2/2004 | |
| JP | 2-226604 | 9/1990 | |
| JP | 2001-015815 | 1/2001 | |
| JP | 2002-334604 | 11/2002 | |
| JP | 2003-504828 | 2/2003 | |
| JP | 2003-188415 | 7/2003 | |
| JP | 2004-71409 | 3/2004 | |
| JP | 2004-120101 | 4/2004 | |
| JP | 2004-276739 | 10/2004 | |
| JP | 2004-537173 | 12/2004 | |
| WO | WO 98/12757 | 3/1998 | |
| WO | WO 01/01037 | 1/2001 | |
| WO | WO 01/01038 | 1/2001 | |
| WO | WO 01/05193 | 1/2001 | |
| WO | WO 03/010830 | 2/2003 | |
| WO | WO 2004/086822 | 10/2004 | |

OTHER PUBLICATIONS

Authorized officer: Kahn, K-D., International Search Report, PCT/DE2005002154, Feb. 15, 2006.

U.S. Appl. No. 60/611,539, filed Sep. 21, 2004.

English translation of DE 10 2004 060 890.3, by Florian Koller, dated Aug. 23, 2011.

* cited by examiner

MOTOR VEHICLE HEADLIGHT ELEMENT

CROSS REFERENCE TO RELATED APPLICATIONS

This application is the Continuation Application of U.S. patent application Ser. No. 11/721,870, filed on Jun. 15, 2007, which is a National Stage of International Application No. PCT/DE2005/002154, filed on Nov. 30, 2005, which claims the priority to German Patent Application Serial No. 10 2004060890.3, filed on Dec. 17, 2004. The contents of both applications are hereby incorporated by reference in their entireties.

FIELD OF THE INVENTION

The invention relates to a motor vehicle headlight element.

BACKGROUND

The documents WO 01/01037 A1 and WO 01/01038 A1 describe a motor vehicle headlight.

SUMMARY

One object of the present invention is to specify a motor vehicle headlight element with a particularly long life.

A motor vehicle headlight element is specified.

The motor vehicle headlight element is suitable, for example, for operation as a light-producing element in a motor vehicle front headlight. To this end, a plurality of similar motor vehicle headlight elements can be arranged in one front headlight. It is also possible for the motor vehicle headlight also to contain other light-producing components, such as halogen lamps or gas-discharge lamps, in addition to the motor vehicle headlight elements.

According to at least one embodiment of the motor vehicle headlight element, the motor vehicle headlight element contains at least one light-emitting diode. The light-emitting diode contains at least one light-emitting diode chip, and the light-emitting diode preferably contains a plurality of light-emitting diode chips. The motor vehicle headlight element is preferably suitable for emission of white light.

In at least one embodiment of the motor vehicle headlight element, the motor vehicle headlight element contains a control apparatus. The control apparatus is suitable for processing a signal which is dependent on a measurement variable.

The measurement variable may, for example, be a temperature, the intensity with which the light-emitting diode in the motor vehicle headlight element emits electromagnetic radiation, the ambient brightness outside the headlight element, the current which is flowing through the light-emitting diode, or the like. The measurement variable is detected by a detector and is converted to an electrical signal. The control apparatus is suitable for processing the electrical signal which has been produced as a function of the measurement variable and for applying a corresponding current to the light-emitting diode. This means that the control apparatus controls the current flowing through the light-emitting diode as a function of at least one physical measurement variable. The control apparatus may, for example contain a microprocessor.

According to at least one embodiment of the motor vehicle headlight element, the control apparatus and the light-emitting diode are arranged on a common mount. For example, the mount is a printed circuit board. This means that electrical connecting points are arranged on the mount, by means of which, for example electrical contact can be made from the outside with the control apparatus. Furthermore, the mount preferably has electrical conductor tracks, which are suitable for electrically connecting the connecting points and the control apparatus, as well as the control apparatus and the light-emitting diode, to one another. The mount is also preferably used as a heat conduction element and is suitable for emitting the heat that is produced by the light-emitting diode during operation to, for example a heat sink on which the mount is mounted. According to at least one embodiment of the motor vehicle headlight element, the motor vehicle headlight element thus has at least one light-emitting diode.

Furthermore, the motor vehicle headlight element has at least one control apparatus which is suitable for processing a signal which is dependent on a measurement variable and for applying a current corresponding to the signal to the light-emitting diode, with the control apparatus and the light-emitting diode being arranged on a common mount.

According to at least one embodiment of the motor vehicle headlight element, the control apparatus is suitable for determination of the current through the light-emitting diode as a function of the voltage drop across a resistor. For this purpose, a shunt resistor is connected in series with the light-emitting diode. The resistor is preferably arranged on the mount. With the aid of the voltage drop across the known resistor, the control apparatus is suitable for determination of the current through the light-emitting diode. The actual value determined in this way can be compared by the control apparatus with a nominal current value. The control apparatus is then suitable for readjustment of the current through the light-emitting diode in such a way that the current through the light-emitting diode at least approaches the nominal current value.

The nominal current value may for this purpose be predetermined, for example from outside the motor vehicle headlight element. For this purpose, an appropriate signal is injected into the control apparatus from the outside. By way of example, the signal is injected into the control apparatus by means of a connecting pin, to which the control apparatus is conductively connected. For this purpose, the connecting pin is preferably arranged on the mount.

The nominal current can be preferably infinitely variable. This allows, for example, infinitely variable dimming of the light-emitting diode by variation of the nominal current value.

According to at least one embodiment of the motor vehicle headlight element, this motor vehicle headlight element is suitable for applying the current through the light-emitting diode as a function of the signal from a temperature sensor. The control apparatus is preferably also suitable for provision of a control current for operation of the temperature sensor.

The temperature sensor produces an electrical signal as a function of the temperature of the light-emitting diode. If, for example the temperature of the light-emitting diode exceeds a predetermined maximum value, then the control apparatus is suitable for reduction of the current through the light-emitting diode. The control apparatus is also suitable for production of an appropriate fault signal on reaching or exceeding the maximum value. The fault signal may, for example, be passed to the exterior by means of a connecting pin.

According to at least one embodiment of the motor vehicle headlight element, the temperature sensor is thermally coupled to the light-emitting diode. This means that at least a portion of the heat which is produced by the light-emitting diode in operation is passed by means of thermal coupling from the light-emitting diode to the temperature sensor. For example, the thermal coupling may be in the form of thermal conduction, thermal radiation or convection. The temperature sensor is provided, for example by one of the following components: NTC thermistor, PTC thermistor, infrared temperature sensor, diode. When using a diode as a temperature sensor the temperature may be determined, for example by means of the temperature dependency of the forward voltage across the diode.

According to at least one embodiment of the motor vehicle headlight element, the temperature sensor is arranged on the mount. If the mount is a printed circuit board, then the temperature sensor can be connected to the control apparatus by means of conductor tracks on the printed circuit board. On the one hand, the signal that is produced by the temperature sensor can in this way be passed to the control apparatus, on the other hand, the temperature sensor can be supplied with a control current from the control apparatus.

According to at least one embodiment of the motor vehicle headlight element, the control apparatus is suitable for application of the current through the light-emitting diode as a function of the signal from a photodetector.

The control apparatus is in this case preferably suitable for provision of a control current for operation of the photodetector. The photodetector may, for example be a photodiode or a phototransistor.

According to at least one embodiment of the motor vehicle headlight element, the photodetector is suitable for detection of the electromagnetic radiation which is essentially emitted from the light-emitting diode. The term "electromagnetic radiation which is essentially emitted from the light-emitting diode" in this context means that, for example small amounts of scattered light from the outside of the motor vehicle headlight element can also strike the photodetector. The photodetector is, however, preferably positioned in such a way that it detects primarily the electromagnetic radiation emitted from the light-emitting diode in the motor vehicle headlight element.

For example, it is possible to use the intensity as measured by the photodetector to determine whether all of the light-emitting diodes in the motor vehicle headlight element are serviceable. It is also possible to use the photodetector to determine whether the radiation intensity of one light-emitting diode has decreased, for example because of ageing phenomena. The current through the light-emitting diode can then be increased appropriately by the control apparatus. If one light-emitting diode has failed or the intensity of the electromagnetic radiation emitted from the light-emitting diode has decreased excessively as a result of ageing phenomena, then the control apparatus is suitable for production of a fault signal. By way of example, the fault signal can be emitted to the exterior by means of a connecting pin. The connecting pin is preferably arranged on the mount, for this purpose.

According to at least one embodiment of the motor vehicle headlight element, the photodetector is arranged on the mount. If the mount is a printed circuit board, then the photodetector can be connected to the control apparatus via the existing conductor tracks on the printed circuit board, in order to pass on signals and in order to supply a control current to the photodetector.

According to at least one embodiment of the motor vehicle headlight element, the photodetector is suitable for detecting essentially the ambient brightness. The term "essentially the ambient brightness", in this case, means that the photodetector is arranged in such a way that it detects primarily light from outside the headlight element. At most a small portion of scattered light from the motor vehicle headlight element strikes the photodetector. For example, an external photodetector such as this allows a current to be applied to the light-emitting diode as a function of the external lighting conditions. If the ambient brightness decreases—for example when driving through a tunnel—it is thus possible to increase the current level through the light-emitting diode. When the ambient brightness increases, the current level can then be reduced again.

The electrical signal which is produced by the photodetector may, for example, be supplied to the control apparatus by means of a connecting pin. The connecting pin is preferably arranged on the mount for this purpose. If the mount is a printed circuit board then the connecting pin is connected to the control apparatus by means of conductor tracks on the printed circuit board.

The motor vehicle headlight element preferably has not only a photodetector outside the headlight element for detection of the ambient brightness, but also an internal photodetector for determination of the intensity of the electromagnetic radiation emitted from the light-emitting diode.

According to at least one embodiment of the motor vehicle headlight element, the external photodetector is arranged outside the headlight, for example on the motor vehicle car body.

According to at least one embodiment of the motor vehicle headlight element, at least one varistor is arranged on the mount. The varistor is used, for example, as protection for the components of the motor vehicle headlight element against overvoltages. For example, the varistor represents protection against ESD (electrostatic discharge) voltage pulses.

According to at least one embodiment of the motor vehicle headlight element, at least one varistor is connected in parallel with the light-emitting diode. The varistor is then used as ESD protection for the light-emitting diode in the reverse-biased direction.

According to at least one embodiment of the motor vehicle headlight element, at least one pi filter is arranged on the mount. The pi filter is used, for example, for radio suppression.

According to at least one embodiment of the motor vehicle headlight element, a pulse-width modulation circuit is arranged on the mount. The pulse-width modulation circuit is preferably suitable for dimming the light-emitting diode. The pulse-width modulation circuit produces current at a specific level $I_1$, for example for a specific time interval $T_1$. No current flows through the light-emitting diode ($I_2=0$) for a specific time interval $T_2$. By way of example, the pulse-width modulation produces an electrical square-wave signal for this purpose. The higher the duty cycle $T_1/(T_1+T_2)$, the longer the time for which current flows through the light-emitting diode in the time interval $T_1+T_2$, and the brighter the light-emitting diode appears to the human user.

The frequency of the pulse-width modulation circuit $1/(T_1+T_2)$ is preferably at least 100 Hz, so that the light-emitting diode appears to be illuminated continuously to the human viewer owing to the inertia of the human optical signal processing.

According to at least one embodiment of the motor vehicle headlight element, the control apparatus is suitable for setting the duty cycle of the pulse-width modulation circuit. For example, the control apparatus can preset a specific duty cycle for the pulse-width modulation circuit on the basis of an external signal which is supplied to the control apparatus. This allows the light-emitting diode to be dimmed infinitely variably, in a preferred manner.

According to at least one embodiment of the motor vehicle headlight element, a current controlled voltage supply may be arranged on the mount. By way of example, the voltage supply may be a step-up/step-down controller. A DC/DC converter such as this is preferably suitable for conversion of an external input voltage to a voltage which is suitable for operation of the light-emitting diode. By way of example, the input voltage may be between 6 and 16 V.

The light-emitting diode may be operated, for example with a voltage between 1 and 5 V per light-emitting diode chip. The light-emitting diode is preferably operated with a voltage of about 3.3 V, per light-emitting diode chip. In the case of a light-emitting diode having five light-emitting diode chips by way of example, which are connected in series, a voltage of about 17 V is applied to the light-emitting diode.

A flyback converter can also be arranged on the mount, as an alternative to or an addition to a step-up/step-down controller.

According to at least one embodiment, the control apparatus is suitable for setting the duty cycle of the DC/DC converter. For example, the light-emitting diode can thus be dimmed infinitely variably as a function of an external signal which is supplied to the control apparatus.

According to at least one embodiment of the motor vehicle headlight element, at least one connecting pin is arranged on the mount. If the mount is a printed circuit board, then the connecting pin is preferably connected to the control apparatus via conductor tracks on the printed circuit board.

According to at least one embodiment, an external electrical signal is injected into the control apparatus by means of at least one connecting pin.

By way of example, a connecting pin is used to inject into the control apparatus a signal which presets a nominal current value for the current level flowing through the light-emitting diodes.

Furthermore, a connecting pin can be used to inject into the control apparatus a signal which is produced by an external detector—for example by a photodetector.

Furthermore, a switching signal can be injected into the control apparatus via a connecting pin. The light-emitting diode in the headlight element can be switched on and off via the control apparatus by means of the switching signal, that is to say current flows through the light-emitting diode, or does not flow through the light-emitting diode, from the control apparatus as a function of the switching signal.

Furthermore, at least one connecting pin can be arranged on the mount, to which a supply voltage is supplied for operation of the motor vehicle headlight element. This supply voltage may be DC voltage or AC voltage. If an AC voltage is applied to the connecting pin, then a rectifying element is preferably arranged on the mount and is suitable for conversion of the AC voltage to a DC voltage which is suitable for operation of the light-emitting diode and of the control apparatus.

At least one connecting pin is preferably TTL compatible for incoming signals.

Furthermore, connecting pins can be arranged on the mount which are suitable for passing a signal that is produced by the control apparatus to the exterior. For example, when a fault occurs, such as the failure of a light-emitting diode or the overheating of a light-emitting diode, an appropriate signal can be applied to a connecting pin.

All of the connecting pins which are arranged on the mount are preferably each ESD protected by means of a varistor. The connecting pins are particularly preferably suitable for bus coupling.

According to at least one embodiment of the motor vehicle headlight element, the light-emitting diode has at least one light-emitting diode chip. The light-emitting diode preferably has a plurality of light-emitting diode chips. The light-emitting diode chips in the light-emitting diode may, for example, be connected in parallel or in series.

The light-emitting diode chip is preferably followed by light-emitting diode optics. The light-emitting diode particularly preferably has a plurality of light-emitting diode chips, which are followed by common light-emitting diode optics. The light-emitting diode optics are preferably positioned with respect to the light-emitting diode chips in such a way that the majority of the electromagnetic radiation which is emitted from the light-emitting diode chips is influenced by the light-emitting diode optics. The light-emitting diode optics preferably contain at least one of the following optical elements: refractive optics, diffractive optics, reflective optics, fibre optics.

According to at least one embodiment of the motor vehicle headlight element, the light-emitting diode optics are suitable for reducing the divergence of the light emitted from the light-emitting diode chip. This means that the light emitted from the light-emitting diode chips is influenced, for example on passing through the light-emitting diode optics, in such a way that its divergence after it emerges is less than before entering the light-emitting diode optics.

In at least one embodiment of the motor vehicle headlight element, the light-emitting diode optics are in the form of a non-imaging optical concentrator. In this case, the light-emitting diode optics are preferably arranged downstream from the radiation output surface of at least one light-emitting diode chip in such a way that the radiation inlet opening of the optical element is the actual radiation outlet opening of the concentrator. In this way, electromagnetic radiation which enters the light-emitting diode optics through the radiation inlet opening leaves the concentrator with less divergence through the radiation outlet opening.

The light-emitting diode optics may be formed at least partially according to the type of one of the following optical elements: compound parabolic concentrator (CPC); compound elliptic concentrator (CEC); compound hyperbolic concentrator (CHC).

The light-emitting diode optics may have reflective side walls which are suitable for reflection of at least a portion of the electromagnetic radiation emitted from the light-emitting diode chip. The side walls are then at least partially in the form of one of the optical elements mentioned above.

According to at least one embodiment of the motor vehicle headlight element, the non-imaging optics concentrator has side walls which connect the radiation inlet opening to the radiation outlet opening of the light-emitting diode optics and are in this case designed in such a way that connecting lines which run on the side walls run essentially linearly between the radiation inlet opening and the radiation outlet opening. By way of example, the side walls are in this case in the form of a truncated pyramid or a truncated cone.

The light-emitting diode optics may be a solid body composed of a dielectric material. The electromagnetic radiation which enters the light-emitting diode optics through the radiation inlet opening is then preferably totally internally reflected on the side boundary surfaces between the solid body and the surrounding medium. The light-emitting diode optics may, however, also be formed by a hollow body whose inner walls are coated such that they are reflective.

In at least one embodiment of the motor vehicle headlight element, each light-emitting diode chip has one and only one associated light-emitting diode optics element. The radiation inlet opening of the optical element is in this case preferably arranged downstream from the radiation output surface of the light-emitting diode chip, in a main emission direction of the light-emitting diode chip.

However, it is also possible for a plurality of light-emitting diode chips to be associated with one common light-emitting diode optics element. The light-emitting diode chips may for this purpose be arranged, for example along at least one straight line. The radiation inlet opening of the optical element is then arranged downstream from the overall area of the radiation output surfaces of the individual light-emitting diode chips in one main emission direction of the light-emitting diode chips.

According to at least one embodiment, the radiation inlet opening of the light-emitting diode optics has a cross-sectional area which is at most twice as large as the total radiation output area of the light-emitting diode chips which are associated with the optical element. The total radiation output area is given by the sum of the radiation output areas of the individual light-emitting diode chips which are associated with the light-emitting diode optics. The area of the radiation inlet opening is preferably at most 1.5, and particularly preferably at most 1.25 times the size of the total radiation output area of the light-emitting diode chips which are associated with the light-emitting diode optics.

With a radiation inlet opening as small as this, the solid angle into which the electromagnetic radiation is emitted can be reduced in size as close as possible to the radiation output area of the light-emitting diode chip. The cross-sectional area of the conical beam which is emitted from the light-emitting diode chip is particularly small there. This allows components to be designed with optimized etendue. This means that a radiation level that is as high as possible is projected onto an area which is as small as possible. The etendue is a conserved quantity in optics and is formed by the product of the area content of a light source and the spatial angle into which the light source emits.

In at least one embodiment of the motor vehicle headlight element, a gap, for example an air gap, is arranged between the radiation output surface of the light-emitting diode chip and the radiation inlet opening of the light-emitting diode optics.

This means that no particularly divergent radiation enters the light-emitting diode optics, but can emerge at the side through the gap before entering the light-emitting diode optics. This makes it possible to further reduce the divergence of the electromagnetic radiation emitted from the optical element.

Instead of a gap, it is also possible, for example to form the side walls which are arranged downstream from the radiation output surface of the light-emitting diode chip in a way, such that they are absorbent or transparent for electromagnetic radiation close to the radiation inlet opening of the optical element. This makes it possible to ensure that the highly divergent component of the electromagnetic radiation emitted from the light-emitting diode chip does not enter the optical element.

According to at least one embodiment of the motor vehicle headlight element, the radiation outlet opening of the optical element is followed by an additional optical element in the main emission direction. The additional optical element is preferably in the form of light-refracting or light-diffracting optics, making it possible to achieve a further reduction in the divergence of the radiation passing through the additional optical element.

The light-emitting diode optics preferably reduce the divergence of a conical beam passing through the radiation inlet opening at least in one spatial direction in such a way that the conical beam, when it emerges through the radiation outlet opening, has a beam angle of between 0 and 70°, preferably between 0 and 30°, and particularly preferably between 0 and 10° with respect to a longitudinal centre axis of the optical element which is at right angle to the radiation output surface of a light-emitting diode chip which is associated with the light-emitting diode optics.

In at least one embodiment of the motor vehicle headlight element the light-emitting diode has a luminescence conversion material which follows the radiation output surface of at least one of the light-emitting diode chips. A luminescence conversion material preferably follows the radiation output surface of each light-emitting diode chip in the motor vehicle headlight element.

The luminescence conversion material is preferably suitable for wavelength conversion of at least a portion of the electromagnetic radiation emitted from the light-emitting diode chip. The radiation emitted from the light-emitting diode chip is preferably mixed with the component whose wavelength has been converted, to form white light.

However, it is also possible for the electromagnetic radiation emitted from the light-emitting diode chip to have its wavelength essentially completely converted by the luminescence conversion material. For example, this allows radiation emitted from the light emitting diode chip in the non-visible spectral range to be converted to radiation in the visible spectral range. Use of two different fluorescent substances in the luminescence conversion material, for example, makes it possible, for example, to produce white light by light mixing. Suitable fluorescent materials for wavelength conversion are described, for example, in the document WO 98/12757 whose disclosure content relating to fluorescent materials is hereby included by back-reference.

The luminescence conversion material may in at least one embodiment of the motor vehicle headlight element be added to an at least partially radiation-permeable encapsulation compound. The encapsulation compound preferably at least partially surrounds the light-emitting diode chip. The encapsulation compound may, for example contain epoxy or silicone materials.

The luminescence conversion material may, however, also be applied as a thin film directly onto the radiation output surface of the individual light-emitting diode chips.

Furthermore, it is possible for the luminescence conversion material to be included in the light-emitting diode optics, at least in places. The luminescence conversion material can thus, for example be applied as a thin film to the side walls which are arranged downstream from the radiation output surface of the light-emitting diode chip. The luminescence conversion material may be distributed homogeneously on the side walls. However, it is possible for the luminescence conversion material to be applied to defined points on the side walls. This allows particularly well defined conversion of the electromagnetic radiation passing through the optical element.

According to at least one embodiment, it is also possible for the light-emitting diode to contain light-emitting diode chips which emit radiation at different wavelengths. This radiation is then preferably mixed to form white light. For example, the light-emitting diode may contain at least one light-emitting diode chip which is suitable for emission of light in the red spectral range, at least one light-emitting diode chip which is suitable for emission of light in the green spectral range and at least one light-emitting diode chip which is suitable for emission of light in the blue spectral range. In order to improve the colour reproduction, the light-emitting diode may additionally have light-emitting diode chips which are suitable for emission of light in other spectral ranges—for example in the yellow spectral range.

According to at least one embodiment of the motor vehicle headlight element, the motor vehicle headlight element has at least one light-emitting diode which is suitable for emission of electromagnetic radiation in the non-visible spectral range. The light-emitting diode is preferably suitable for emission of radiation in the infrared spectral range. For this purpose, by way of example, the light-emitting diode may contain at least one light-emitting diode chip which is suitable for emission of radiation in the infrared spectral range. The motor vehicle headlight element is then suitable, for example for use as an illumination device for the traffic area, in conjunction with infrared-sensitive cameras. Systems such as these may be used in night-vision systems, in sensor systems for pedestrian protection, or as proximity sensor systems for motor vehicles. Illumination by means of an infrared radiation source in this case offers the particular advantage that none of those involved in the traffic situation are dazzled, even with a relatively high radiation power.

In at least one embodiment of the motor vehicle headlight element at least one of the light-emitting diode chips in the light-emitting diode has a radiation output surface through which the majority of the electromagnetic radiation emitted from the light-emitting diode chip is emitted. All of the radiation which is emitted from the light-emitting diode chip is particularly preferably emitted through the radiation output surface.

The radiation output surface is, for example, provided by a portion of the surface of the light-emitting diode chip. The radiation output surface is preferably provided by a main surface of the light-emitting diode chip which, for example is arranged parallel to an epitaxial layer sequence of the light-emitting diode chip which is suitable for production of electromagnetic radiation.

For this purpose, for example the epitaxial layer sequence may have a pn junction, a double hetero structure, a single quantum well or, particularly preferably a multiple quantum well structure.

The expression quantum well structure, for the purpose of the application, covers any structure in which charge carriers experience quantization of their energy states by confinement. In particular, the expression quantum well structure does not include any details about the dimensions of the quantization and thus, inter alia, covers quantum boxes, quantum wires and quantum dots and any combination of these structures.

The light-emitting diode chip is preferably a semiconductor light-emitting diode chip in which the growth substrate has been at least partially removed and to whose surface facing away from the original growth substrate a mount element is applied. The mount element can be chosen relatively freely in comparison to a growth substrate. A mount element is preferably chosen whose thermal coefficient of expansion is matched particularly well to the radiation-producing epitaxial layer sequence. Furthermore, the mount element may contain a material which is particularly highly thermally conductive.

Light-emitting diode chips such as these which are produced by the removal of the growth substrate are often referred to as thin-film light-emitting diode chips and are preferably distinguished by the following features:

A reflective layer or layer sequence is applied to or formed on a first main surface, which faces the mount face of the radiation-producing epitaxial layer sequence. The reflective layer or layer sequence reflects at least a portion of the electromagnetic radiation that is produced in the epitaxial layer sequence back into this layer sequence.

The epitaxial layer sequence preferably has a thickness of at most 20 μm, and particularly preferably of at most 10 μm.

Furthermore, the epitaxial layer sequence preferably contains at least one semiconductor layer with at least one surface which has a mixing structure. In the ideal case, this mixing structure leads to an approximately ergodic distribution of the light in the epitaxial layer sequence, that is to say it has a stochastic scattering behaviour which is as ergodic as possible.

One fundamental principle of thin-film light-emitting diode chips is described, for example in the document by I. Schnitzer et al., Appl. Phys. Lett. 63 (16), 18 Oct. 1993, 2174-2176, whose disclosure content of the fundamental principle of thin-film light-emitting diode chips is hereby included by back-reference.

All of the light-emitting diode chips in the motor vehicle headlight element are preferably thin-film light-emitting diode chips.

The motor vehicle headlight element described here will be explained in more detail in the following text using exemplary embodiments and with reference to the associated figures. In the exemplary embodiments and figures, identical components or components having the same effect are in each case provided with the same reference symbols. The illustrated elements cannot be regarded as being to scale, and in fact individual elements may be illustrated in a highly exaggerated form, in order to assist understanding.

DETAILED DESCRIPTION

Figure 1:
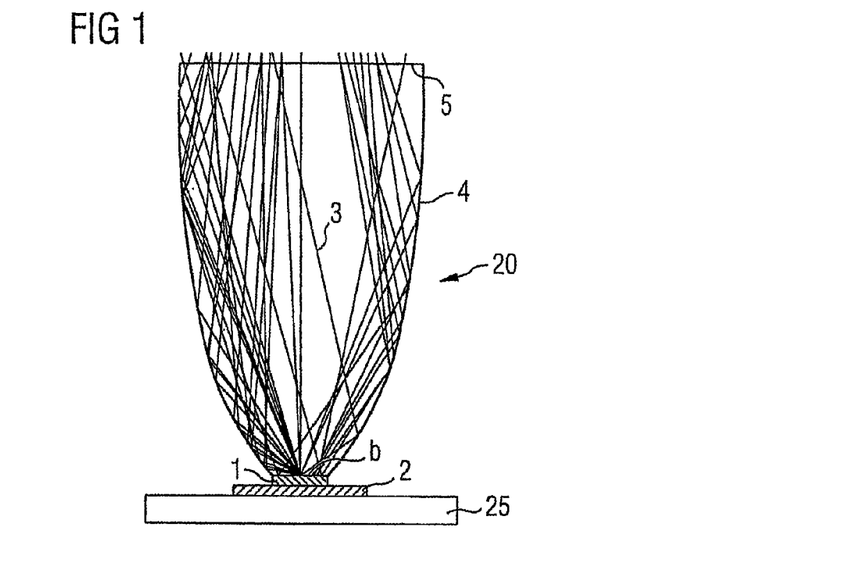
FIG. 1 shows a schematic section illustration of a light-emitting diode with light-emitting diode optics according to a first exemplary embodiment of the light-emitting diode.

FIG. 1 shows a schematic section illustration of a light-emitting diode 20 with light-emitting diode optics 4 according to a first exemplary embodiment of the light-emitting diode 20.

In this case, the light-emitting diode chip 1 is arranged in a housing 2. By way of example the housing 2 may contain a ceramic material. For example, the housing 2 has contacts through it in order to make contact with the light-emitting diode chip 1. In the illustrated exemplary embodiment, the housing 2 is fitted to a printed circuit board 25. The printed circuit board 25 has, for example, conductor tracks and contact points for making contact with the light emitting diode chip 1.

The light-emitting diode chip 1 is, for example a thin-film light-emitting diode chip, as is explained in the general part of the description.

The light-emitting diode chip 1 is followed by light-emitting diode optics 4 which may, for example, be a three-dimensional non-imaging optical concentrator, in the form of a CPC. The light-emitting diode optics 4 have a light inlet opening b through which electromagnetic radiation 3 emitted from the light-emitting diode chip 1 can pass. The electromagnetic radiation 3 is at least partially reflected on the side walls of the light-emitting diode optics 4 which, for this purpose, are provided for example with a reflective coating. The radiation 3 leaves the light-emitting diode optics through the radiation outlet opening 5.

The closer the radiation inlet opening b of the light-emitting diode optics 4 is moved to the radiation output surface of the light-emitting diode chip 1, the smaller the radiation inlet opening b may be designed to be and the higher is the radiation intensity (etendue) of the electromagnetic radiation 3 emerging through the radiation outlet opening 5. The light-emitting diode optics 4 and the light-emitting diode chip 1 together form the light-emitting diode 20.

Figure 4A:
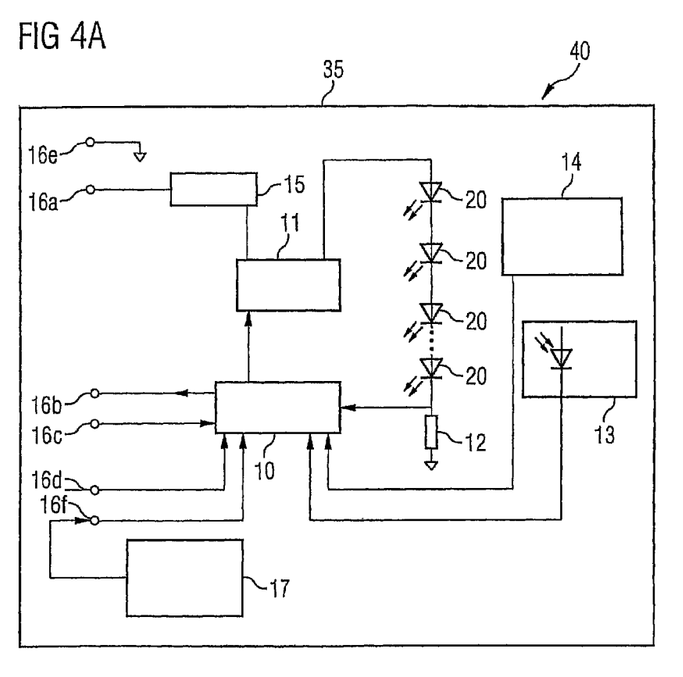
FIG. 4a shows a schematic view of a first exemplary embodiment of the motor vehicle headlight element described here.
Figure 4B:
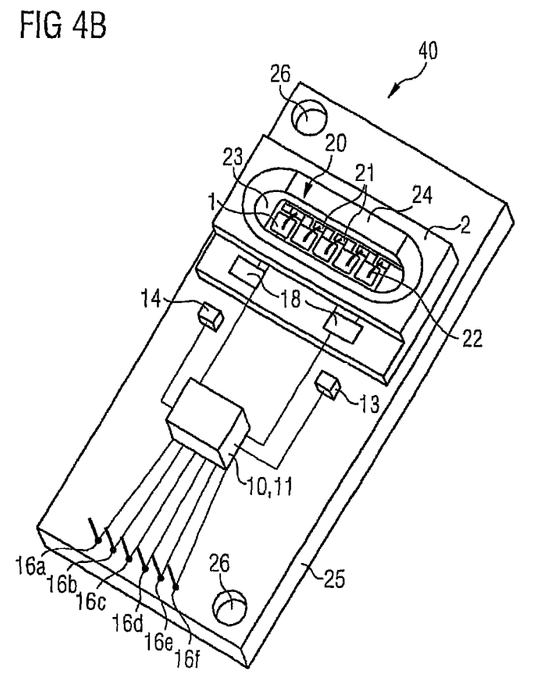
FIG. 4b shows a perspective view of a second exemplary embodiment of the motor vehicle headlight element described here.

As an alternative to the exemplary embodiment illustrated in FIG. 1, it is possible to arrange a plurality of light-emitting diodes, for example along a straight line in the housing 2 and for these light-emitting diode chips to have common associated light-emitting diode optics 4 (see also FIG. 4b).

Figure 2:
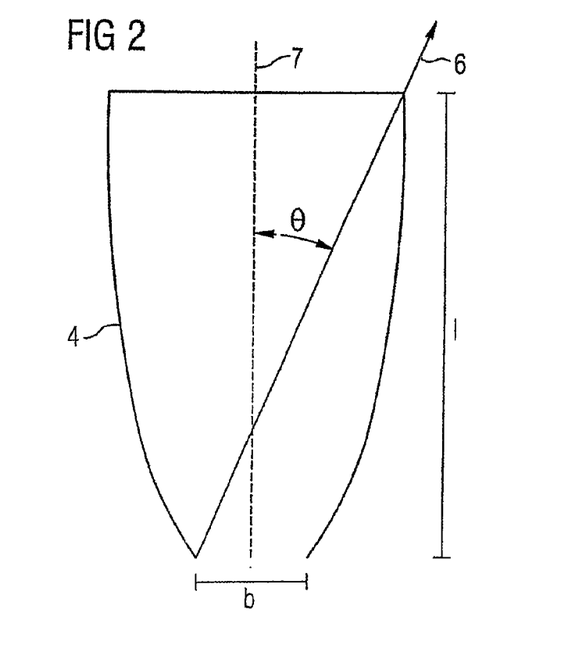
FIG. 2 shows a schematic sketch in order to explain the method of operation of a non-imaging optical concentrator.

FIG. 2 shows that the conical beam 6 of the radiation passing through the light-emitting diode optics 4 leaves the radiation outlet opening 5 at a maximum angle θ with respect to a centre axis 7 of the light-emitting diode optics 4. The length l of the light-emitting diode optics 4 in this case governs the angle θ for a given width of the radiation inlet opening b. By way of example, the relationship for an ideal compact parabolic concentrator is as follows:

$$1 = \frac{b}{2}(1 + \sin\theta)\frac{\cos\theta}{\sin^2\theta}$$

In order to achieve a maximum beam angle of, for example, θ=9°, the length l of the light-emitting diode optics must be approximately 23 times as large as the width of the radiation inlet opening b.

Figure 3:
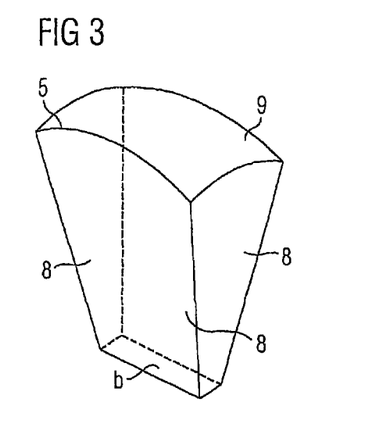
FIG. 3 shows a section illustration of light-emitting diode optics according to a second exemplary embodiment of the light-emitting diode.

FIG. 3 shows that, as an alternative to a CPC-like optical concentrator, the light-emitting diode optics may also have side walls 8 which run in straight lines from the radiation inlet opening b to the radiation outlet opening 5. In this case, the light-emitting diode optics 4 may be a solid body composed of a dielectric material, whose basic shape is in the form of a truncated cone or truncated pyramid. In addition, the radiation outlet opening 5 may be curved outwards in the form of a spherical or aspheric lens, which forms an additional light-emitting diode optics element 9, which is an integral part of the light-emitting diode optics and is suitable for reducing the divergence of the radiation 3 passing through the optical element 4.

FIG. 4a shows a schematic plan view of a first exemplary embodiment of the motor vehicle headlight element 40 described here.

At least one light-emitting diode 20, as is illustrated by way of example in FIG. 1, is in this case arranged on a mount 25. The mount 25 is, for example a printed circuit board, for example, a metal core board. The mount 25 may, for example, have a base area of at most 30 mm×60 mm, preferably of at most 20 mm×40 mm, and particularly preferably of at most 15 mm×30 mm.

A shunt resistor 12 is connected in series with the light-emitting diodes 20. The control apparatus 10 can use the voltage drop across the resistor 12 to determine the current which is flowing through the light-emitting diodes 20. For example, the control apparatus 10 may include an integration circuit in order to determine the current through the light-emitting diodes 20.

The current through the light-emitting diodes 20 is set by the control apparatus 10, on the basis for example of a nominal current value. The nominal current value may be predetermined for the control apparatus 10 by an external electrical signal. The external signal is supplied, for example by means of the connecting pin 16d to the control apparatus 10.

Current flows through the light-emitting diodes 20 when an appropriate switching signal (enable signal) is supplied to the control apparatus 10. By way of example, the switching signal may be supplied to the control apparatus 10 by means of a connecting pin 16c.

Furthermore, the control apparatus 10 may be supplied externally with the signal from an external photodetector 17 by means of the connecting pin 16f. The light-emitting diodes 20 then have current passed through them by the control apparatus 10 as a function of the ambient brightness.

The control apparatus 10 may be supplied with signals from a photodetector 13 and from a temperature sensor 14 as a function of internal measurement variables, which are governed essentially by the operating state of the light-emitting diodes 20.

The temperature sensor 14 is preferably suitable for production of a signal which is dependent on the temperature of the light-emitting diodes 20. The signal from the temperature sensor 14 is passed to the control apparatus 10, where it is processed. The control apparatus 10 then controls the current through the light-emitting diodes 20 as a function of the signal. If the temperature of the light-emitting diodes 20 is too high, for example, then the current flowing through the light-emitting diodes 20 can be reduced by the control apparatus 10.

The internal photodetector 13 determines the intensity of the electromagnetic radiation 20 emitted from the light-emitting diodes 20. The signal from the photodetector 13 is passed to the control apparatus 10. If the intensity of the light-emitting diodes 20 decreases, for example because of ageing phenomena, then the current through the light-emitting diodes 20 can be readjusted appropriately with the aid of the control apparatus 10.

Both the temperature sensor 14 and the photodetector 13 are preferably mounted on the mount 25. The temperature sensor may, for example, be thermally coupled to the light-emitting diodes by thermal conduction by means of the mount 25. The mount 25 is then used as a thermal conductive element. Furthermore, they are electrically connected to the control apparatus 10 by means of conductor tracks on the mount 25.

In the event of a fault, for example in the event of failure of a light-emitting diode or overheating of the light-emitting diode, the control apparatus 10 can emit an appropriate fault signal to the connecting pin 16b.

Furthermore, the control apparatus 10 is suitable for setting an appropriate duty ratio for a controllable voltage supply 11. The control apparatus 10 can control the current through the light-emitting diodes 20 in this way.

By way of example, the control apparatus 10 may have a microprocessor in order to process the signals arriving at the control apparatus 10. By way of example, the control apparatus 10 may be a microcontroller.

By way of example, the controllable voltage supply 11 is a DC/DC converter, which can be operated at a frequency of 100 to 500 kHz.

The controllable voltage supply 11 is suitable for conversion of an input voltage (which is applied to the connecting pin 16a by way of example) to a voltage which is suitable for operation of the light-emitting diodes 20.

The motor vehicle headlight element is earthed via the connecting pin 16e.

A varistor (not illustrated) may be connected to earth at all of the connecting pins 16a to 16f, for example as protection against overvoltages.

Furthermore, as shown on the basis of the example of the connecting pin 16a, a pi filter which may contain a capacitor and an inductance can be connected in series with the connecting pins 16a to 16f. The pi filter is used, for example, for radio suppression.

Furthermore, at least one connecting pin (not illustrated) can be arranged on the mount 25 to form a communication interface, for example a LIN bus.

FIG. 4b shows a perspective illustration of a second exemplary embodiment of the motor vehicle headlight element 40 described here. In this exemplary embodiment, a light-emitting diode 20 is arranged on a metal-core board which acts as the mount 25.

By way of example, the light-emitting diode 20 comprises five light-emitting diode chips 1. The light-emitting diode chips 1 are arranged, for example, on the base 23 of a housing 2. The housing 2 contains, for example a ceramic material. The housing 2 may have inner walls which are shaped in the form of a non-imaging optical concentrator. The inner walls 24 of the housing 2 are preferably designed to be reflective, at least in places. The inner walls 24 may be followed by light-emitting diode optics (not illustrated) in the main imaging direction of the light-emitting diode chips 1, as has been described further above. The light-emitting diode chips 1 make contact with inner contact surfaces 21 by means of bonding wires 22. The inner contact surfaces are electrically conductively connected to outer contact surfaces 18, via which electrical contact can be made with the light-emitting diode.

The mount 25 may also have adjusting holes 26 by which the motor vehicle headlight element can be adjusted, for example with respect to a mount 33.

Figure 5:
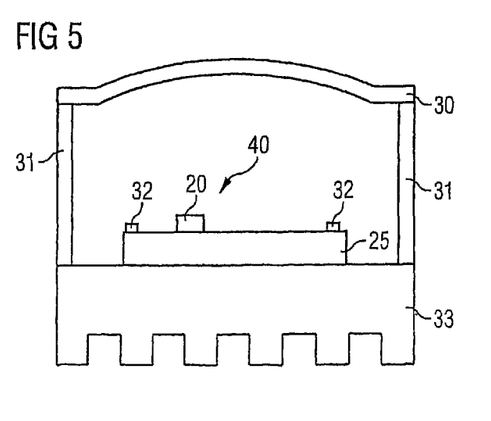
FIG. 5 shows a schematic side view of one exemplary embodiment of a motor vehicle headlight with the motor vehicle headlight element described here.

FIG. 5 shows a schematic section illustration of a headlight with the headlight elements 40 described here.

A plurality of motor vehicle headlight elements 40 as described in FIGS. 4a and 4b can in this case be mounted on one mount 33. For example, three motor vehicle headlight elements 40 are mounted on the mount 25. The mount 33 is preferably also used as a heat sink for the heat that is produced during operation by the light-emitting diodes 20 during operation. By way of example, the mount 33 for this purpose has cooling ribs on its surface that faces away from the motor vehicle headlight elements 40. The mount 33 preferably contains a highly thermally conductive metal, such as copper.

The motor vehicle headlight elements 40 and the mount 33 can be adjusted with respect to one another by means of adjusting pins 32. The motor vehicle headlight elements 40 are also adjusted with respect to one another in this way. The adjusting pins 32 may be separate components. The mount 33 and the motor vehicle headlight elements 40 then have recesses, for example adjusting holes. The adjusting holes on the mount 33 and motor vehicle headlight element 40 have a suitable diameter such that the adjusting pins 32 are flush with the adjusting holes.

Furthermore, it is possible for the adjusting pins 32 to be an integral component of the mount 33. This means that the adjusting pins are mechanically firmly connected to the mount 33. This can be done, for example, even during the production of the mount 33. The printed circuit board 25 for the motor vehicle headlight element 40 then has recesses 26 (see FIG. 4b) which are suitable for holding these adjusting pins.

It is likewise possible for the adjusting pins 32 to be an integral component of the motor vehicle headlight element 40. Recesses for holding these adjusting pins are then provided in the mount 33.

It is also possible for the mount 33 and the motor vehicle headlight elements 40 to be adjusted with respect to one another by means of adjusting marks. The alignment of the motor vehicle headlight elements 40 with respect to the mount 33 and thus also the alignment of the motor vehicle headlight elements 40 with respect to one another can then be achieved, for example, by means of an image processing system. Adjusting marks are for this purpose located, for example, on the printed circuit board 25 in the motor vehicle headlight element 40. The adjusting marks may be recorded by a camera and aligned with respect to a reference point, which is located on the mount 33. The reference point may be a further adjusting mark.

The adjusting marks in the mount 33 and motor vehicle headlight element 40 are provided either by markings or specific elements in the components of the headlights. By way of example, specific light-emitting diode chips 1 in the light-emitting diode 20 may represent adjusting marks such as these.

By way of example, the motor vehicle headlight elements 40 are followed by a common optical element 30. The optical element 30 is, for example, a diffractive or refractive lens, which follows all of the motor vehicle headlight elements 40 in the headlight, so that the light which is emitted from all of the light-emitting diodes 20 is influenced by the optical element 30.

The optical element 30 and the mount 33 are adjusted with respect to one another by means of adjusting pins 31. The motor vehicle headlight elements 40 and the optical element 30 are also adjusted with respect to one another in this way.

The adjusting pins may be separate components. However, it is also possible for the adjusting pins to be an integral component of the mount 33 or of the optical element 30. The other component in each case then has recesses—for example adjusting holes—which are suitable for holding the adjusting pins.

Preferably after the light-emitting diodes 20 and the mount 33 have been adjusted and the optical element 30 and the mount 33 have been adjusted with respect to one another, the motor vehicle headlight elements 40 are mechanically firmly connected to the mount. For example, the motor vehicle headlight elements 40 may be adhesively bonded to the mount 33, screwed or swaged to the mount 33. The optical element 30 is also firmly mechanically connected to the mount 33 preferably after the adjusting process.

The invention is not restricted by the description on the basis of the exemplary embodiments. In fact, the invention covers any novel feature as well as any combination of features, which, in particular, includes any combination of features in the patent claims, even if this feature or this combination itself is not explicitly stated in the patent claims or exemplary embodiments.

What is claimed is:

1. Motor vehicle headlight element, comprising:
   at least one light-emitting diode with at least one light-emitting diode chip;
   a luminescence conversion material which follows the radiation output surface of the light-emitting diode chip or of at least one of the light-emitting diode chips, the luminescence conversion material is for wavelength conversion of at least a portion of the electromagnetic radiation emitted from the at least one light-emitting diode chip;

at least one light-emitting diode with at least one light-emitting diode chip which is for emission of radiation in the infrared spectral range;

at least one control apparatus, which is for processing a signal which is dependent on a measurement variable and for applying a current corresponding to the signal to the light-emitting diode, wherein the control apparatus and the light-emitting diode are arranged on a common mount; and wherein the motor vehicle headlight element is for emission of white light.

2. Motor vehicle headlight element according to claim 1, which comprises only one light-emitting diode.

3. Motor vehicle headlight element according to claim 1, further comprising a temperature sensor, wherein the control apparatus is suitable for application of the current to the light-emitting diode as a function of the signal from the temperature sensor;

wherein the temperature sensor is thermally coupled to the light-emitting diode; and wherein the temperature sensor is arranged on the mount.

4. Motor vehicle headlight element according to claim 1, further comprising a photodetector, wherein the control apparatus is suitable for application of the current to the light-emitting diode as a function of the signal from the photodetector;

wherein the photodetector is suitable for detection of the electromagnetic radiation which is emitted from the light-emitting diode; and wherein the photodetector is arranged on the mount.

5. Motor vehicle headlight element according to claim 1, further comprising a photodetector, wherein the control apparatus is suitable for application of the current to the light-emitting diode as a function of the signal from the photodetector;

wherein the photodetector is suitable for detecting an ambient brightness; and wherein the photodetector is arranged outside the headlight.

6. Motor vehicle headlight element according to claim 1, further comprising a pulse-width modulation circuit which is arranged on the mount, wherein the pulse-width modulation circuit is suitable for dimming the light-emitting diode; and wherein the control apparatus is suitable for setting the duty cycle of the pulse-width modulation circuit.

7. Motor vehicle headlight element according to claim 1, further comprising a controllable voltage supply which is arranged on the mount, wherein the light-emitting diode chips of the light-emitting diode are electrically connected in series; and wherein the voltage supply is suitable to provide a voltage between 1 and 5 V per light-emitting diode chip.

8. Motor vehicle headlight element according to claim 1, in which the light-emitting diode contains at least one thin-film light-emitting diode chip, wherein a reflective layer or layer sequence is applied to or formed on a first main surface, which faces the mount face of a radiation-producing epitaxial layer sequence of the thin-film light-emitting diode chip;

wherein the epitaxial layer sequence has a thickness of at most 10 µm and wherein the epitaxial layer sequence contains at least one semiconductor layer with at least one surface which has a mixing structure, the mixing structure has a stochastic scattering behaviour.

9. Motor vehicle headlight element according to claim 1, wherein the control apparatus and the light-emitting diode are arranged on a same main side of the common mount.

10. Motor vehicle headlight element according to claim 1, further comprising a varistor and at least one connecting pin which is arranged on the mount, wherein the at least one connecting pin is connected in parallel with the varistor.

11. Motor vehicle headlight element according to claim 10, wherein the at least one varistor is connected in parallel with the light-emitting diode.

12. Motor vehicle headlight element according to claim 1, further comprising light-emitting diode optics, wherein the light-emitting diode optics follow at least one of the light-emitting diode chips of the light-emitting diode; and wherein the light-emitting diode optics are suitable for reducing the divergence of the electromagnetic radiation emitted from said light-emitting diode chips.

13. Motor vehicle headlight element according to claim 12, wherein the light-emitting diode comprises a plurality of light-emitting diode chips which are suitable for emission of light in the blue spectral range; and wherein the light-emitting diode optics are a common optical element for all of the light-emitting diode chips.

14. Motor vehicle headlight element according to claim 12, wherein the light-emitting diode optics are a non-imaging optical concentrator; and wherein the light-emitting diode optics are formed partially or completely according to the type of at least one of the following optical elements: compound parabolic concentrator; compound ellyptic concentrator; compound hyperbolic concentrator, truncated pyramid, truncated cone.

15. Motor vehicle headlight element according to claim 12, wherein the light-emitting diode optics comprise reflective side walls which are suitable for reflection of at least a portion of the electromagnetic radiation emitted from the light-emitting diode chips.

16. Motor vehicle headlight element according to claim 12, wherein at least a portion of the luminescence conversion material is included in the light-emitting diode optics.

17. Motor vehicle headlight element according to claim 12, wherein the luminescence conversion material is applied as a thin film to side walls of the light-emitting diode optics, said side walls are arranged downstream from the radiation output surface of the light-emitting diode chips.

18. Motor vehicle headlight element according to claim 12, wherein the light-emitting diode optics have a radiation inlet opening which is at most twice as large as the total radiation output area of the light-emitting diode chips which are associated with the light-emitting diode optics.

* * * * *

UNITED STATES PATENT AND TRADEMARK OFFICE
CERTIFICATE OF CORRECTION

PATENT NO.        : 8,884,521 B2
APPLICATION NO.   : 13/417516
DATED             : November 11, 2014
INVENTOR(S)       : Gerhard Behr et al.

It is certified that error appears in the above-identified patent and that said Letters Patent is hereby corrected as shown below:

In the Claims

Column 16, line 39, in Claim 16, delete "ellyptic" and insert -- elliptic --.

Signed and Sealed this
Twenty-first Day of April, 2015

Michelle K. Lee
*Director of the United States Patent and Trademark Office*